Nov. 3, 1959  R. J. FRANCK  2,911,262
VEHICLE AXLE
Filed July 1, 1955  3 Sheets-Sheet 3
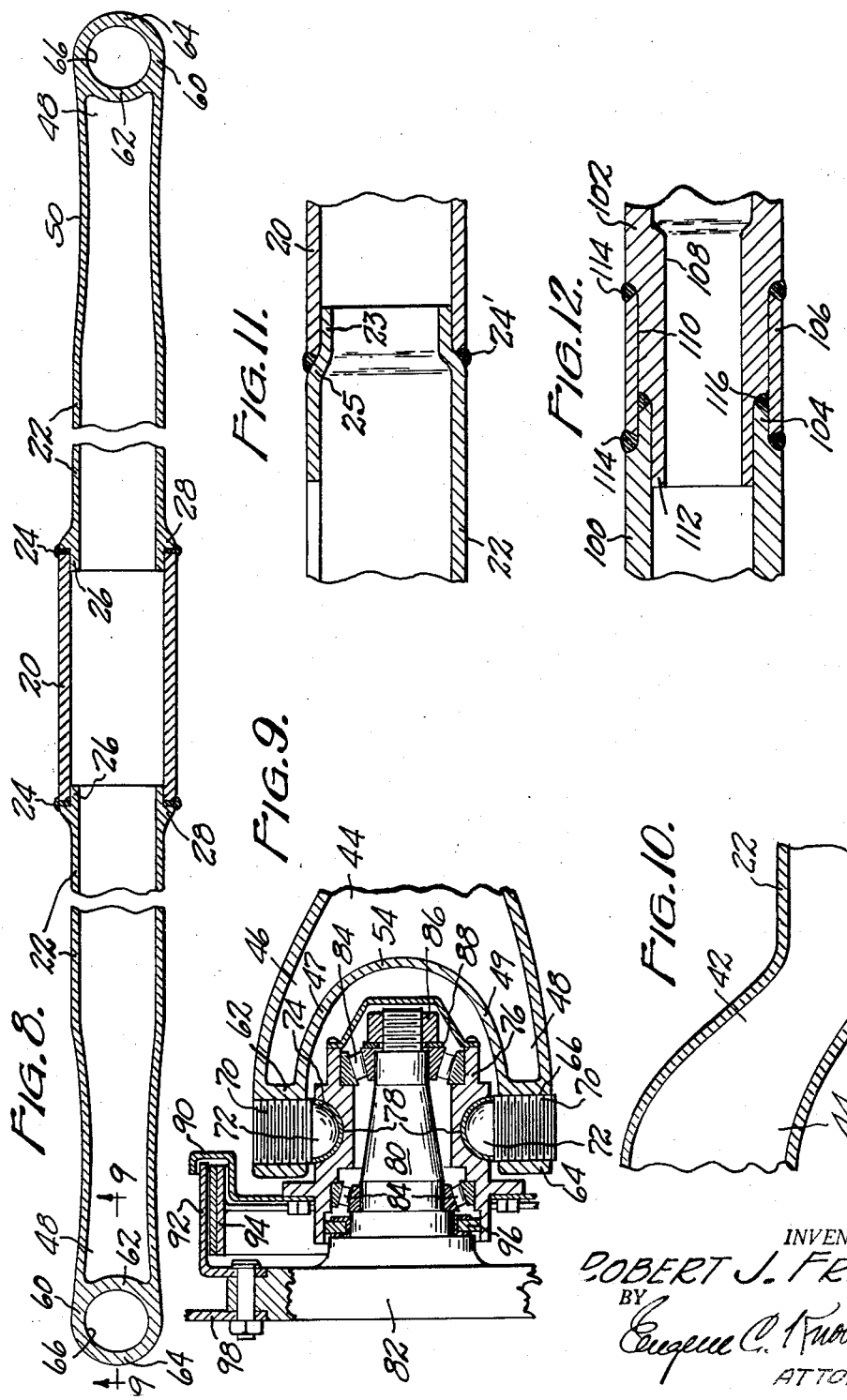
INVENTOR.
ROBERT J. FRANCK
BY
Eugene C. Knoblock
ATTORNEY

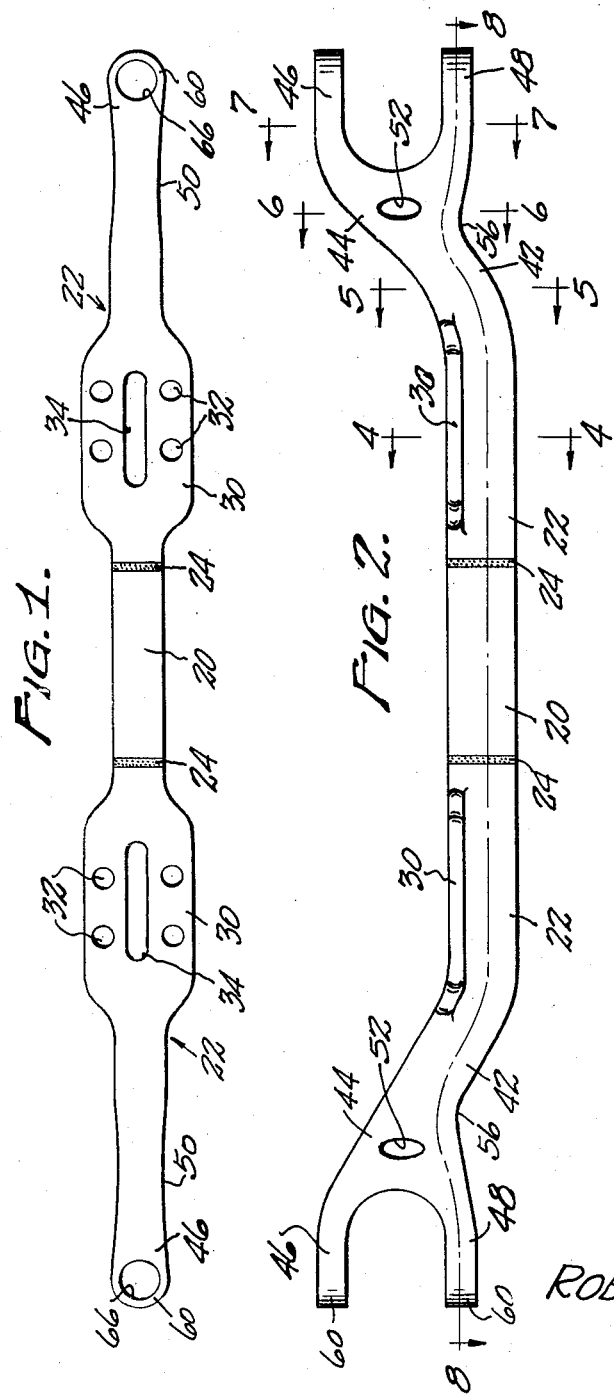

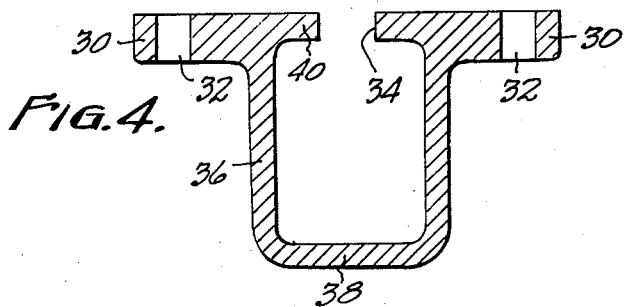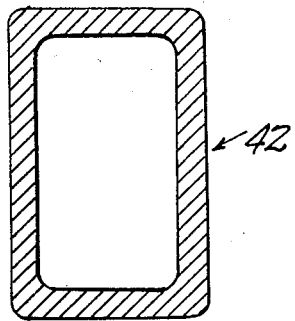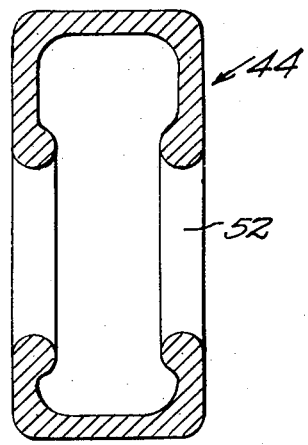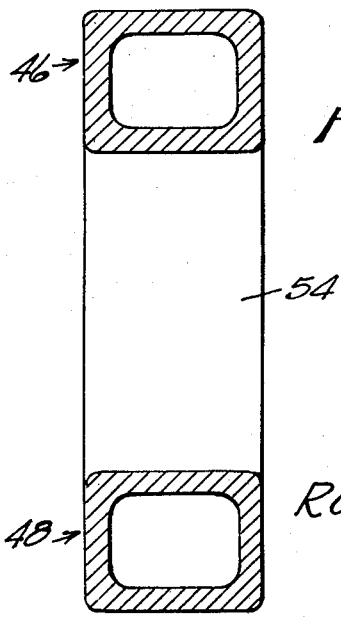

United States Patent Office 2,911,262
Patented Nov. 3, 1959

2,911,262

VEHICLE AXLE

Robert J. Franck, Benton Harbor, Mich., assignor to Superior Steel & Malleable Castings Co., Benton Harbor, Mich., a corporation of Michigan Application July 1, 1955, Serial No. 519,503

5 Claims. (Cl. 301—124)

This invention relates to improvements in vehicle axles, and more particularly to front axles of vehicles for mounting dirigible or steerable wheels.

The general object of the invention is to provide a vehicle axle which is particularly designed and constructed to serve as a component of a "center line" steering construction as distinguished from the more common steering construction in which the dirigible vehicle wheels are mounted on spindles which project laterally from kingpins which provide the vertical axes on which the wheels turn for steering purposes. In "center line" steering the vertical steering axis is disposed near or substantially in the center plane of the wheel so that forces emanating from the wheel by reason of blow-outs, grabbing brakes, contact of the wheel with a soft shoulder along the road, and like adverse driving conditions, are locally resolved so that the wheel continues to run in a straightforward direction.

One of the problems which has impeded the development and progress of "center line" steering is the development of an axle which is constructed to withstand the heavy forces involved in "center line" steering; and another object of this invention is to provide an axle which will resist bending and torsion both in vertical and horizontal direction so that the rigidity of the axle will remain constant under all load conditions. It is another object of this invention to provide an axle which will satisfactorily serve that purpose by construction thereof with such cross-sectional shape, wall thickness, and fairing and merging of parts as to possess adequate strength and rigidity to resist bending and deflection of the axle in use.

A further object is to provide an axle of this character which is light in weight, which has a very high strength in all directions, whose strength is greater than forged axles of the same size, and whose weight is less than such forged axle, such strength and weight being derived from a tubular cross-sectional shape of the axle.

A further object of the invention is to provide a cast axle with convenient means for attachment of a spring thereto through the formation of openings therein while the same is being cast, with the openings serving to accommodate bolts for mounting the springs and also accommodating core prints for the casting operation.

A further object is to provide an axle of his character whose caster is controlled by tilting the axle to the desired extent, as by the use of shims, and which is of sufficient rigidity to require less caster than has been necessary heretofore with forged axle constructions.

A further object is to provide an axle of hollow cast steel construction whose configuration, fairing, controlled wall thicknesses, and overall outline, produce a uniform stress distribution throughout the axle.

A further object is to provide a strong rigid tubular axle formed of a plurality of parts welded together to provide uniform stress distribution without danger of breakage at the welds.

Other objects will be apparent from the following specification.

In the drawings:

Fig. 1 is a top plan view of the axle;
Fig. 2 is a view of the axle in side elevation;
Fig. 3 is an end view of the axle;
Fig. 4 is a transverse sectional view taken on line 4—4 of Fig. 2;
Fig. 5 is a transverse sectional view taken on line 5—5 of Fig. 2;
Fig. 6 is a transverse sectional view taken on line 6—6 of Fig. 2;
Fig. 7 is a transverse sectional view taken on line 7—7 of Fig. 2;
Fig. 8 is a longitudinal sectional view taken on line 8—8 of Fig. 2;
Fig. 9 is an enlarged fregmentary sectional view of the end of the axle, taken on line 9—9 of Fig. 8, and illustrating a fragmentary wheel mount associated with the axle;
Fig. 10 is an enlarged sectional view taken on line 9—9 of Fig. 8 at a point longitudinally displaced from the part shown in Fig. 9;
Fig. 11 is a fragmentary sectional view illustrating a modified embodiment of the invention and, in particular, a weld connection between the two parts constituting sections of the axle; and
Fig. 12 is a fragmentary sectional view illustrating another modified embodiment of the invention and, in particular, another welded joint between parts of the axle.

Referring to the drawings which illustrate the preferred embodiment of the invention, and particularly to the construction illustrated in Figs. 1 to 10, the numeral 20 designates the center section, and the numeral 22 designates the opposite end sections of an axle. Each of the sections or parts 20 and 22 constitutes a hollow steel tubular member whose cross-section may be of any shape desired. The parts 22 constitute steel castings, and part 20 may be cast or otherwise formed. The parts 20 and 22 are welded together at 24 continuously around the circumference or cross-sectional perimeter thereof, and the parts which are welded together may be constructed as illustrated in Fig. 8. Thus the inner end portion 26 of each axle section 22 is of a size and shape to fit snugly within the end of the central tube section 20 for a portion of its length. An integral circumferential or transverse perimetral enlarged rib 28 is formed on each end part 22 and confronts the end of the tube 20 so that the weld 24 is formed between the rib 28 and the end of the center tube section 20 in outwardly spaced relation to the innermost end of the axle section 22 and of the portion 26 thereof which projects into the tube 20. It will be understood that this type of joint is illustrative and is not intended to be limiting and that other joints, such as those illustrated in Figs. 11 and 12, may be employed if desired.

Each of the end components 22 preferably has a pair of longitudinally elongated laterally projecting rigid flanges 30 formed integrally therewith. The flanges have apertures 32 formed therein and a slot 34 preferably is formed between the flanges 30, as seen in Fig. 1. The flanges 30 preferably are at a top or upper portion of the members 22 and preferably have their upper surfaces substantially flush with the upper surfaces of the adjacent axle components 20, 22, as best seen in Fig. 2, and with each other so as to form supports or pads upon which vehicle springs may rest and to which vehicle springs may be secured for the purpose of providing spring suspension of a vehicle chassis (not shown). The cross-sectional shape of the parts is best seen in Fig. 4 in which it will be seen that the flanges 30 may be of a greater thickness than the wall thickness of the adjacent portions of the axle sections 22, and, particularly, of a greater thickness than the side walls 36, bottom wall 38, and top wall 40, of the tubular axle component.

In the case of a drop center axle of the character here illustrated, the portions of the axle adjacent the outer ends of the plates or flanges 30 curve upwardly and retain the tubular cross-section as illustrated in Fig. 5. The overall depth and other transverse dimensions of the upwardly bent portions 42 of the axle preferably are approximately the same as the dimensions of the axle section 22 inwardly thereof. The portions 42 of the axle merge with portions 44, which, as illustrated in Fig. 6, are characterized by a progressively increasing vertical or side wall dimension. Thus, Figs. 5 and 6 illustrate variation in side wall depth although not the total variation permitted, it being apparent from an inspection of Fig. 2 that the vertical dimension of the side walls increases rapidly to accommodate projection of a yoke or bifurcated portion at each end of the axle consisting of an upper tubular fork arm 46 and a lower tubular arm 48. The width or lateral dimension of the axle through the parts 42–48 may be substantially constant if desired, but as illustrated in Fig. 1 may be slightly constricted or reduced at 50 at the portion of greatest vertical dimension, that is, at the portion adjacent that at which the fork arms 46, 48 project.

In the preferred shape of the axle, stress relief holes 52 may be formed in the deep axle portion 44 spaced from the top and bottom portions or walls of the axle and also spaced from the wall 54 joining the bottom wall 47 of the top fork 46 and the top wall 49 of the lower fork 48. A curved portion 56 in the bottom wall of the tube section extends between the parts 42 and 44 and is shaped or faired in a manner to provide maximum stress absorption, strength and rigidity. Similarly, the wall 54 is preferably curved, as best seen in Fig. 9, so that the side wall portions of the tubes taper or spread toward the forks, and the side walls of the tubular forks taper or widen at the junction or margin of the forks with the remainder of the axle and with each other.

Each of the forks 46 and 48 is of tubular cross-section, as best seen in Fig. 7, and preferably the tube wall are of substantially the same thickness as the tube walls in the sections 42 and 44, although this wall thickness may be varied if desired to give the strength required. As best seen in Fig. 7, the tubes forming the forks 46 and 48 are preferably of substantially rectangular cross-section and have their corners rounded as characterizes all of the remaining portions of the axle, as illustrated in Figs. 4, 5 and 6. It will be understood that the tube cross-sectional shape need not be rectangular at the forks or at any part of the axle, however, and instead, may be of any cross-sectional shape selected. At its outer end each fork terminates in a substantially tubular portion 60 having a vertical axis and including a transverse inner wall 62 spanning each fork spaced inwardly from the outer end wall 64 and cooperating therewith to define the bore 66 having a vertical axis transverse of the arm forks 46, 48. The bores 66 of the two forks 46, 48 are axially aligned, and each is preferably internally screw-threaded.

The assembled axle constitutes a built-up unitary strong rigid torque-resisting tube. This tube is closed at both ends and is open only at the slots 34 and the stress-relieving openings 52 which are so located as to interrupt surfaces of larger area than normal and thereby avoid weakening of the structure by their occurrence. These openings serve additionally to receive core prints required in the casting operation. All sections 20, 22 communicate at their interiors and all walls merge with other walls or members in such a manner as to provide adequate strength to resist torque and stress regardless of the direction in which the same is applied. Thus the device takes advantage of the well known properties of strength and rigidity possessed by tubes and produces in a light weight structure all strength required for the purpose.

The axle possesses a very high strength-to-weight ratio, thus as compared to axles formed by forging from solid bar stock, the weight of an axle required for sustaining a given load is much less than is true of the forged axle. Another important characteristic of the device is that the cast construction thereof insures that the axle is relieved of internal stresses incident to its formation. Thus the metal flows freely to fill the cavity of the casting mold and sets in place, assuming an unstressed internal or crystalline structure with wall thicknesses varying from place to place if that is required, as between thin walls 36 and 40 and the comparatively thick flanges 30. Also, the various walls are curved, flared and otherwise shaped to merge with one another along lines of stress and at the locations or positions which insure maximum strength of the unit. For example, the manner in which the top and bottom walls of the structure are curved or formed at the parts 42 and 44 in association with the arrangement of the wall 54 in curved form joining the arms 46 and 48, provides maximum strength and best utilization and location of metal in thinnest structure to accommodate the sustaining of torque and stress normally applied in the running of a vehicle throughout the entire length of the axle. The termination of the fork arms 46 and 48 in axially aligned tubular portions provides maximum strength of the fork ends and accommodates the transmission of stresses between the wheels and the axle with minimum danger of failure.

The manner in which the axle and wheel structure may be connected for so-called "center line" steering is illustrated in Fig. 9. Each of the bores 66 mounts a screw-threaded plug 70 terminating in an inner part-spherical end portion 72 which carries a part-spherical bearing sheath 74 which preferably is formed of synthetic resin material such as "Nylon" having a low coefficient of friction. A tubular unit 76 has diametrically opposed recesses 78 in the outer surfaces of its side walls to receive the bearing members 74.

A spindle member 80 mounted on the wheel hub 82 extends centrally through tube 76. Bearings 84 journal the spindle 80 in the tube structure 76, and the spindle is locked in place by means of a nut 86 bearing against a washer 88, said nut being threaded upon the end of the spindle, and said washer bearing against the inner race of the innermost bearing. The tubular structure 76 may carry a dust shield disk 90 cooperating with a brake drum 92 carried by the wheel hub to define a brake chamber within which the brake shoe mechanism 94 of conventional construction is housed. An oil seal ring 96 may be interposed between a portion of the spindle 80 and the outer end of the tubular structure 76. It will be apparent that this construction accommodates free running of the wheel relative to the axle and also accommodates turning of the wheel about a vertical axis coincident with the vertical axes of the plugs 70, which axis will preferably run through the plane of the wheel, it being understood that a wheel rim mounting disk 98 will be carried by the hub 82 in such position that the tire center plane will substantially coincide with the turning axis of the tube structure 76 upon the semi-spherical members 72. The streamlined manner in which stress applied by this mechanism to the axle is sustained by the axle will be apparent by a consideration of Fig. 9 in association with the other figures, such as Fig. 2, Fig. 8 and Fig. 10. The strength possessed by this device resists bending in both vertical and horizontal direction and likewise resists torsion in any manner in which the same is applied through the wheel mount structure to the axle, or vice versa.

A modified contruction of a connection between center section 20 and end sections 22 is illustrated in Fig. 11. In this instance tubular end unit 22 terminates in a reduced dimension tube part 23 of a size to fit within the section 20, whereby a shoulder is formed at 25 and the outer dimensions of the sections 20 and 22 are substantially similar, as seen in Fig. 11. The combination between the snug fit between the parts 20 and 23 and the circumferential or perimetral weld at 24' insures a strong, rigid, unitary structure free from weakness and capable of withstanding strain, stresses and vibration characterizing the conditions under which axles of this character commonly operate, especially in heavy vehicles such as trucks and buses.

Another modified embodiment of the invention is illustrated in Fig. 12 and is particularly well suited for use in cases where it is desired to make the axle of two parts only. The inner end portions of the two parts 100 and 102 are configured, as seen in Fig. 12, with the outer diameter or cross-sectional size of the part 100 reduced at 104 to fit snugly within a short sleeve 106. The other tube portion 102 has a reduced bore portion 108, a portion 110 whose outer diameter or cross-sectional size is such as to fit snugly within the sleeve 106, and an end portion 112 of still smaller outer diameter or cross-sectional size which extends into the unit 100 for a portion of its length. The sleeve 106 is welded to the tubes 100 and 102 at its opposite ends at 114. If desired, in the case where the sleeve 106 is split, another weld 116 may be provided to interconnect the parts 100 and 102 directly. It will be understood that each of the welds 114 and 116 is continuous circumferentially or perimetrally of the tube and extends continuously around the tube unit. While the construction of the axle as shown herein is one in which the axle is formed of a plurality of tubular sections welded together, there is no requirement that the axle be formed of multiple parts, and the axle may be cast in one integral piece if desired. Likewise, a cast tubular axle of the character described may be constructed for mounting the conventional kingpin type of steering apparatus by pivoting the kingpin in the forks with the wheel journaling stub shaft projecting outwardly between the forks, as is well understood in the art. Also the axle may be used on trailers as well as on self-propelled vehicles.

While the preferred embodiments of the invention have been illustrated and described, it will be understood that changes in the construction may be made within the scope of the appended claims without departing from the spirit of the invention.

I claim:

1. A vehicle axle comprising a cast steel body having a central part of tubular cross-sectional shape, the opposite end portions of said axle being forked, each fork part being of tubular cross-section and terminating in a tubular part transverse of said fork part and defined in part by a wall spanning and closing each fork part, said transverse tubular parts of said fork parts at each end of said axle being axially aligned, said tubular fork parts merging with each other and with said central tubular part at a part of enlarged vertical cross-sectional dimension defined by spaced substantially vertical side walls, upper and lower walls and end walls closing the space between said tubular fork parts.

2. A vehicle axle comprising a cast steel body having a central part of tubular cross-sectional shape, the opposite end portions of said axle being forked, each fork part being of tubular cross-section and terminating in a tubular part transverse of said fork part and defined in part by a wall spanning and closing each fork part, said transverse tubular parts of said fork parts at each end of said axle being axially aligned, said tubular fork parts merging with each other and with said central tubular part at a part of enlarged vertical cross-sectional dimension defined by spaced substantially vertical side walls, upper and lower walls and end walls closing the space between said tubular fork parts, and integral apertured attachment flanges carried by the central part of said body adjacent said fork parts and at the uppermost part thereof.

3. A vehicle axle comprising a cast steel body having a central part of tubular cross-sectional shape, the opposite end portions of said axle being forked, each fork part being of tubular cross-section and terminating in a tubular part transverse of said fork part and defined in part by a wall spanning and closing each fork part, said transverse tubular parts of said fork parts at each end of said axle being axially aligned, said tubular fork parts merging with each other and with said central tubular part at a part of enlarged vertical cross-sectional dimension defined by spaced substantially vertical side walls, upper and lower walls and end walls closing the space between said tubular fork parts, said body being formed of a plurality of interfitting tubular sections welded together perimetrally in spaced relation to the end of the innermost of said interfitting sections.

4. A vertical axle comprising a cast steel body having a central part of tubular cross-sectional shape, the opposite end portions of said axle being forked, each fork part being of tubular cross-section and terminating in a tubular part transverse of said fork part and defined in part by a wall spanning and closing each fork part, said transverse tubular parts of said fork parts at each end of said axle being axially aligned, said tubular fork parts merging with each other and with said central tubular part at a part of enlarged vertical cross-sectional dimension defined by spaced substantially vertical side walls, upper and lower walls and end walls closing the space between said tubular fork parts, the transverse dimension and wall thickness of said body varying from point to point along the axle body proportionally to the stresses applied to said body at said points.

5. A vehicle axle comprising a cast steel body having a central part of tubular cross-sectional shape, the opposite end portions of said axle being forked, each fork part being of tubular cross-section and terminating in a tubular part transverse of said fork part and defined in part by a wall spanning and closing each fork part, said transverse tubular parts of said fork parts at each end of said axle being axially aligned, said tubular fork parts merging with each other and with said central tubular part at a part of enlarged vertical cross-sectional dimension defined by spaced substantially vertical side walls, upper and lower walls and end walls closing the space between said tubular fork parts, the vertical dimension of said body varying along its length and being greatest adjacent each fork part, said end walls between said fork parts being continuously curved.

References Cited in the file of this patent

UNITED STATES PATENTS

| | | |
|---|---|---|
| 1,841,735 | Hufferd et al. | Jan. 19, 1932 |
| 1,892,479 | Arato | Dec. 27, 1932 |
| 1,899,347 | Mogford et al. | Feb. 28, 1933 |
| 2,044,389 | Kay | June 16, 1936 |

FOREIGN PATENTS

| | | |
|---|---|---|
| 283,718 | Great Britain | Jan. 19, 1928 |

UNITED STATES PATENT OFFICE

CERTIFICATE OF CORRECTION

Patent No. 2,911,262                                                   November 3, 1959

Robert J. Franck

It is hereby certified that error appears in the printed specification of the above numbered patent requiring correction and that the said Letters Patent should read as corrected below.

Column 6, line 25, for "vertical" read -- vehicle --.

Signed and sealed this 10th day of May 1960.

(SEAL)
Attest:

KARL H. AXLINE                                                ROBERT C. WATSON

Attesting Officer                                          Commissioner of Patents